(12) United States Patent
Hayhurst

(10) Patent No.: US 6,456,285 B2
(45) Date of Patent: Sep. 24, 2002

(54) OCCLUSION CULLING FOR COMPLEX TRANSPARENT SCENES IN COMPUTER GENERATED GRAPHICS

(75) Inventor: Simon Hayhurst, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/074,027

(22) Filed: May 6, 1998

(51) Int. Cl.[7] ............................................. G06T 15/40
(52) U.S. Cl. ....................... 345/422; 345/629; 345/630; 345/592
(58) Field of Search ................................ 345/422, 629, 345/630, 592

(56) References Cited

U.S. PATENT DOCUMENTS

| | | | | |
|---|---|---|---|---|
| 5,583,974 A | * | 12/1996 | Winner et al. | 345/422 |
| 5,734,806 A | * | 3/1998 | Narayanaswami | 345/422 |
| 5,751,291 A | * | 5/1998 | Olsen et al. | 345/422 |
| 5,825,363 A | * | 10/1998 | Anderson | 345/422 |
| 5,920,687 A | * | 7/1999 | Winner et al. | 345/422 |
| 5,977,979 A | * | 11/1999 | Clough et al. | 345/422 |
| 5,982,376 A | * | 11/1999 | Abe et al. | 345/422 |
| 6,172,679 B1 | * | 1/2001 | Lim | 345/421 |

OTHER PUBLICATIONS

S. Coorg, S. Teller, Real–Time Occlusion Culling for Models with Large Occulders, Computer Graphics Group, MIT Laboratory For Computer Science.

N. Greene, M. Kass and G. Miller, Hierarchical Z–Buffer Visibility.

H. Zhang, D. Manocha, T. Hudson and K.E. Hoff, III, Visibility Culling using Hierarchical Occlusion Maps, Department of Computer Sciences, University of North Carolina, Chapel Hill, NC.

\* cited by examiner

*Primary Examiner*—Jeffery Brier
*Assistant Examiner*—Motilewa Good-Johnson
(74) *Attorney, Agent, or Firm*—Woodcock Washburn LLP

(57) ABSTRACT

A method of and apparatus for efficiently rendering a complex transparent scene. In furtherance of one embodiment of the present invention, the method comprises the step of determining a minimum number of overlapping translucent polygons required to substantially occlude an object or a surface in the scene; and culling away the object or the surface if the object is hidden behind more than the minimum number of overlapping polygons. Objectives of the present invention are achieved as processing efficiency is increased when substantially occluded objects are not further processed. In one embodiment of the invention, a Z-stack comprising a plurality of Z-maps is utilized to store depth information of potentially occluding polygons. A bounded volume approximation method may be used to determine the Z-values of the potentially occluding polygons to be stored in the Z-stack. Thereafter, potentially occluded polygons are tested against the Z-stack. Visibility is determined based on a comparison of the Z-values of the potentially occluded polygons and the Z-values in the Z-stack.

15 Claims, 8 Drawing Sheets

OCCLUSION CULLING FOR COMPLEX TRANSPARENT SCENES IN COMPUTER GENERATED GRAPHICS

FIELD OF THE INVENTION

The present invention relates generally to the field of computer generated graphics. More particularly, the present invention relates to a method and apparatus for efficiently rendering transparent objects in a complex transparent scene.

BACKGROUND OF THE INVENTION

Computer graphics is used in a wide variety of applications, such as in business, science, animation, simulation, computer-aided design, process control, electronic publishing, gaming, medical diagnosis, etc. In an effort to portray a more realistic real-world representation, three dimensional objects are transformed into models having the illusion of depth for display onto a two-dimensional computer screen. This is accomplished by using a number of polygons to represent a three-dimensional object. Next, a scan conversion process is used to determine which pixels of a computer display fall within each of the specified polygons. Thereupon, texture is selectively applied to those pixels residing within specified polygons. Finally, lighting, shading, shadowing, translucency, and blending effects are applied.

For a high resolution display (1280×1024) having over a million pixels, for which values must be generated for each and every pixel, displaying a three-dimensional scene on a computer system is a rather complicated task. Processes like lighting, shading, shadowing, texture mapping, blending, etc., are particularly computation intensive, requiring a tremendous amount of processing power. Indeed, even more processing power is necessary for displaying interactive computer graphics, where 3-D images change in response to a user input (e.g. flight simulation). Naturally, the more complex the scene, the more processing power will be required to render that scene.

Although throughput of computer graphics systems has increased considerably in recent years, the size and complexity of three-dimension scenes have been growing even faster. Scenes composed of millions of polygons are no longer uncommon. In light of the enormous processing power necessary to generate highly-complex scenes and the limitations in the speed of currently available hardware, there have been efforts to develop more efficient methods to simplify the task of rendering three-dimensional images. One such method is known as visibility culling or occlusion culling. Simply put, visibility culling limits the number of polygons rendered in each frame by removing hidden or obscured surfaces from the graphics pipeline. When these hidden surfaces are culled away, highly complex scenes can be rendered at a very high rate.

Visibility culling for opaque surfaces is typically performed with a method known as Z-buffer visibility culling. Essentially, Z-buffer visibility culling involves utilizing a Z-buffer for storing the Z-values for a small number of potentially occluding polygons of a scene, and comparing Z-values of a potentially occluded polygon of the scene with the Z-values stored in the Z-buffer before the potentially occluded polygon is drawn. If it is determined that the Z-values of the potentially occluded polygon represents a closer distance to the view point than that represented by the Z-values in the Z-buffer, then the potentially occluded polygon is drawn. Otherwise, the potentially occluded polygon is rejected from the graphics pipeline. In this way, processing bandwidth is not wasted on occluded objects, effectively increasing rendering efficiency.

Z-buffers, however, do not handle transparent or partially transparent polygons well. For instance, imagine a scene having a partially transparent polygon and an opaque one. If the Z-buffer stores the Z-values of the partially transparent polygon, then the opaque polygon may not be drawn if it is positioned behind the partially transparent polygon. On the other hand, if the Z-buffer does not store the Z-values of the partially transparent polygon, there will not be sufficient information to determine the polygons' relative order. Then, the partially transparent polygon will not be culled away even if it is positioned behind the opaque polygon. Hence, partially transparent or translucent polygons cannot contribute to an accurate, conventional Z-buffer or occlusion test. This yields inefficiencies in scenes containing such polygons and surfaces.

Thus, what is needed is a method and apparatus for accelerating the rendering of complex transparent scenes. What is further needed is a method and apparatus for performing visibility culling that is capable of handling transparent and partially transparent polygons.

SUMMARY OF THE PRESENT DISCLOSURE

The present invention is a method of and apparatus for efficiently rendering a complex transparent scene. In furtherance of one embodiment of the present invention, the method comprises steps of determining Z-values for a pre-determined number of potential occluders selected from the transparent scene, storing the Z-values in a Z-stack, comparing Z-values of a potential occludee with the Z-values in the Z-stack, and removing the potential occludee from further processing provided that the Z-values of the potential occludee do not represent a closer distance from a view point than that represented by the Z-values in the Z-stack. Objectives of the present invention are achieved as processing efficiency is increased when substantially occluded objects are not further processed. Such an approach is validated by the observation that although a single partially transparent polygon is not an occluder, it is an attenuator of light. Hence, a plurality of such polygons positioned in succession along a viewing direction may be considered as occluders.

In accordance with one embodiment of the present invention, a Z-stack comprises a three-dimensional array for storing Z-values of the potential occluders. Particularly, each Z-stack includes a plurality of Z-maps corresponding to different depth levels of the transparent scene. Each pixel is associated with an entry in each of the Z-maps, and each entry includes a Z-value corresponding to a distance from the view point to the point on one of the overlapping objects. In one embodiment, the Z-maps are ranked in a descending order with the highest ranked Z-map associating with the frontmost surface of the frontmost objects in the scene, and the lowest ranked Z-map associating with the backmost surface of the backmost objects visible in the scene. In another embodiment, a plurality of pixels are mapped to each entry of the Z-maps for increased processing efficiency.

In one embodiment of the present invention, the Z-values of the potential occluders are computed by the CPU(s) of a computer system. In that embodiment, a bounded volume comprising simple geometrical primitives is first determined for each of the potential occluders. Because Z-values for simple geometrical primitives can be quickly calculated by the CPU, the Z-values for the potential occluders can be easily calculated. The computed Z-values are then stored in the Z-stack according to their respective depth levels in the scene. In one embodiment of the present invention, Z-values that represent a closer distance from the view point are stored in a higher-ranked Z-map, and Z-values that represent a farther distance from the view point are stored in a lower-ranked Z-map. In one embodiment, new Z-value replaces the Z-value stored in one of the Z-maps if the new Z-value represents a closer distance to the view point than that of the stored Z-value. The replaced Z-value is then stored in a lower-ranked Z-map. The use of a bounded volume generates a conservative but efficient representation of the occluder's extent. In another embodiment, the exact occluder's extent may be generated by direct calculation.

In yet another embodiment of the present invention, the Z-values of the potential occluders may be determined by graphics hardware. In that embodiment, potential occluders are sent to the graphics hardware to be drawn, and the Z-values associated with the potential occluders are returned from the graphics hardware (e.g. by reading the hardware Z-buffer). The Z-values are then stored in a software Z-stack within the memory of the computer system. In yet another embodiment of the present invention, the Z-stack may be implemented in hardware and may be further implemented in the graphics hardware of the computer system, or in a specialized computational unit.

According to one embodiment of the present invention, after the Z-values of the potential occluders are stored in the Z-stack, objects or surfaces not designated as potential occluders (also known as potential occludees) are tested against the Z-stacks. In one embodiment of the present invention, Z-values of a potential occludee are compared against the Z-values of the potential occluders in the Z-stack. If the Z-values of the potential occludee do not represent a closer distance from a view point than that of the Z-values in the Z-stack, the potential occludee is considered occluded, and it is removed from further processing. Otherwise, the potential occludee is further processed. Alternatively, Z-values of the potential occludees may be calculated by CPU using a bounding volume approximation method as described above, or may be determined by graphics hardware.

In furtherance of one embodiment of the present invention, the Z-maps of the Z-stack may have a lower resolution than that of the frame buffer. In one embodiment, a coarser resolution is achieved by representing the Z-values of a group of pixels by a highest Z-value associated with the group. Alternatively, an average Z-value associated with a group of pixels may be used.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE
PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "transmitting", "inserting", "sorting" or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

I. COMPUTER SYSTEM ENVIRONMENT OF THE
PRESENT INVENTION

Figure 1:
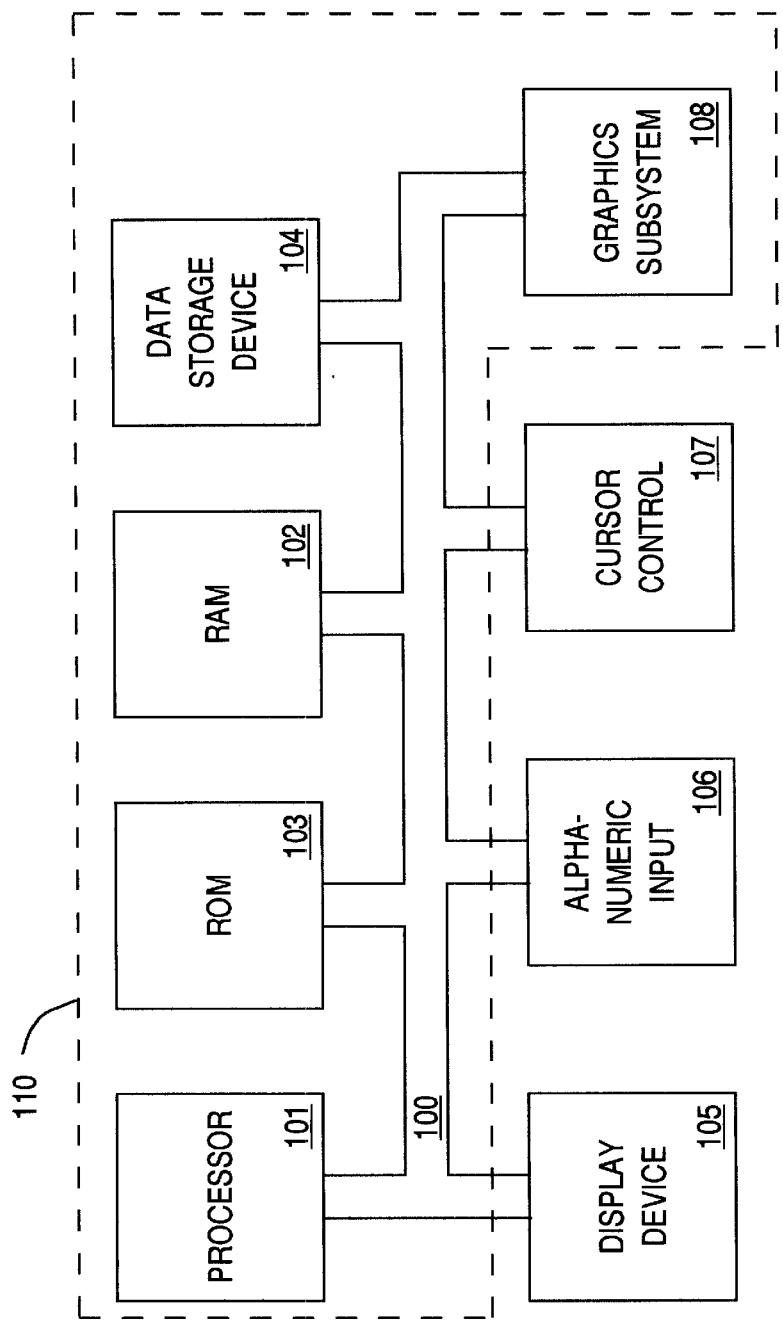
FIG. 1 illustrates an exemplary computer system used as part of a computer graphics system in accordance with one embodiment of the present invention.

With reference to FIG. 1, portions of the present invention are comprised of computer-readable and computer executable instructions which -reside, for example, in computer-usable media of a computer system. FIG. 1 illustrates an exemplary computer system 110 used as a part of a computer graphics system in accordance with one embodiment of the present invention. It is appreciated that system 1 10 of FIG. 1 is exemplary only and that the present invention can operate within a number of different computer systems including general purpose computer systems, embedded computer systems, and stand alone computer systems specially adapted for generating 3-D graphics.

System 110 of FIG. 1 includes an address/data bus 100 for communicating information, and a central processor unit 101 coupled to bus 100 for processing information and instructions. System 110 also includes data storage features such as computer usable volatile memory 102, e.g. random access memory (RAM), coupled to bus 100 for storing information and instructions for central processor unit 101, computer usable non-volatile memory 103, e.g. read only memory (ROM), coupled to bus 100 for storing static information and instructions for the central processor unit 101, and a data storage device 104 (e.g., a magnetic or optical disk and disk drive) coupled to bus 100 for storing information and instructions. A graphics subsystem 108 (e.g. a graphics card) coupled to bus 100 is also included in system 110 of FIG. 1. System 110 of the present high-speed transparent scene rendering system also includes an optional alphanumeric input device 106 including alphanumeric and function keys is coupled to bus 100 for communicating information and command selections to central processor unit 101. System 110 also optionally includes a cursor control device 107 coupled to bus 100 for communicating user input information and command selections to central processor unit 101. System 110 of the present embodiment also includes an optional display device 105 coupled to bus 100 for displaying information.

Display device 105 of FIG. 1, utilized with the present invention, may be a liquid crystal device, cathode ray tube, or other display device suitable for displaying 3-D graphic images and alphanumeric characters recognizable to a user. Optional cursor control device 107 allows the computer user to dynamically signal the two dimensional movement of a visible symbol (cursor) on a display screen of display device 105. Many implementations of cursor control device 105 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 107 using special keys and key sequence commands. The present invention is also well suited to directing a cursor by other means such as, for example, voice commands. A more detailed discussion of the present complex transparent scene rendering system is found below.

II. DETERMINING A NUMBER OF POLYGON LAYERS REQUIRED TO ACHIEVE OCCLUSION EFFECT

In the following discussion, unless otherwise noted, it is assumed that each pixel is associated with a transmission coefficient k which ranges from 0 to 1. When k is 0, the polygon is opaque and transmits no light; when k is 1, the polygon is perfectly transparent. Further, it is assumed that light attenuation is cumulative. That is, for two overlapping polygons each having a uniform transparency of 0.5, a cumulative transparency of the overlapping polygons would be 0.5*0.5 or 0.25. Likewise, for three overlapping polygons each having a uniform transparency of 0.1, 0.2 and 0.3, respectively, the cumulative transparency would be 0.1*0.2*0.3 or 0.006.

One of the key factors influencing how fast a transparent scenes can be rendered relates to the fact that low cumulative transparency is approximately opaque. For instance, for a scene having an average transparency of 0.1, three overlapping polygons will probably have a cumulative transparency of 0.001. In that scene, it would be safe to assume that objects located behind four to five layers of polygons are substantially occluded. Therefore, in the following discussion, unless noted otherwise, objects that are substantially occluded by layers of translucent polygons are considered invisible.

According to one embodiment of the present invention, a minimum number of layers of translucent polygons necessary for substantially occluding other objects is determined by a user. In alternative embodiments, the minimum number may be determined by calculating an average transparency of polygons in the scene, and by calculating the number of layers of polygon having the average transparency value required to achieve a predetermined visibility threshold. For example, if it is determined that the average transparency is 0.2 and that the user selected a visibility threshold of 0.01, then it can be easily calculated that a minimum number of layers of overlapping polygons for producing an occlusion effect is 3. Generally, the larger the visibility threshold, more objects will be occluded and rendering efficiency is increased. However, a large visibility threshold may also cause a decrease in rendering accuracy. It should be apparent to a person of ordinary skill in the art, upon reading the present disclosure, that other methods may be used to determine the minimum number of layers of translucent polygons necessary for producing an occlusion effect.

III. USING Z-STACK TO STORE DEPTH INFORMATION OF POTENTIAL OCCLUDERS

Figure 2A:
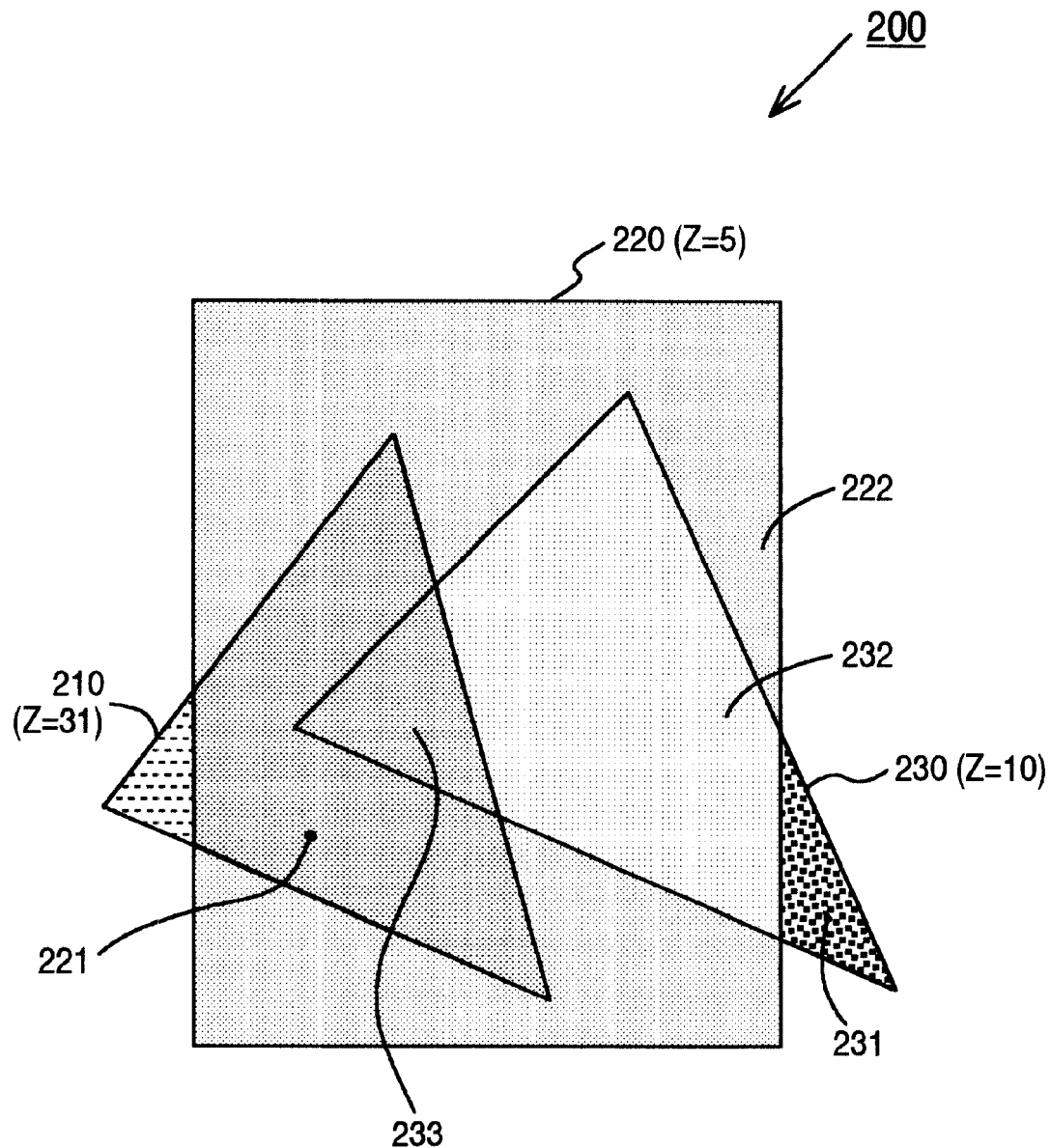
FIG. 2A illustrates an exemplary transparent scene that may be rendered according to one embodiment of the present invention.

FIG. 2A is an exemplary transparent scene 200 that is used herein to illustrate principles of the present invention. For simplicity, transparent scene 200 comprises three translucent objects—two triangles 210 and 230, and a rectangle 220. As shown in FIG. 2, triangle 210 is closest to the viewpoint, followed by rectangle 220 and triangle 230. Particularly, triangle 210 has a depth value, or Z-value, of 3, rectangle 220 has a Z-value of 5, and triangle 210 has a Z-value of 10. Rectangle 220 comprises two sections 221, and 222. Section 221 is overlapped by triangle 210, and section 222 overlaps part of triangle 230. Lastly, triangle 230 comprises three sections 231, 232, and 233. Section 231 is not overlapped by other objects, while section 232 is overlapped by rectangle 220, and section 233 is overlapped by both rectangle 220 and triangle 210.

For simplicity, triangles 210 and 230, and rectangle 220 have a transmission coefficient of 0.2. Further, as an example, a visibility threshold is set to be 0.05. That is, objects hidden behind polygons with a cumulative transmission coefficient of 0.05 will be considered invisible. The average transmission coefficient is 0.2. Therefore, occlusion effect would be achieved by superimposing two layers of translucent polygons to cumulatively produce a combined transmission coefficient of 0.04.

In the exemplary transparent scene 200, triangle 210 and rectangle 220 has a cumulative transparency of 0.04. Since an visibility threshold is set to be 0.05, objects overlapped by both triangle 210 and rectangle 220 will be considered invisible. Thus, section 233 of triangle 230, which hidden behind two layers of translucent objects (triangle 210 and rectangle 220) is not visible. Likewise, other objects or polygons, if hidden behind two layers of translucent objects, will also be selected for culling. In this way, processing power of a computer system will not be wasted on essentially invisible polygons, and processing efficiently of a computer system implemented with the present invention would be significantly increased.

Figure 2B:
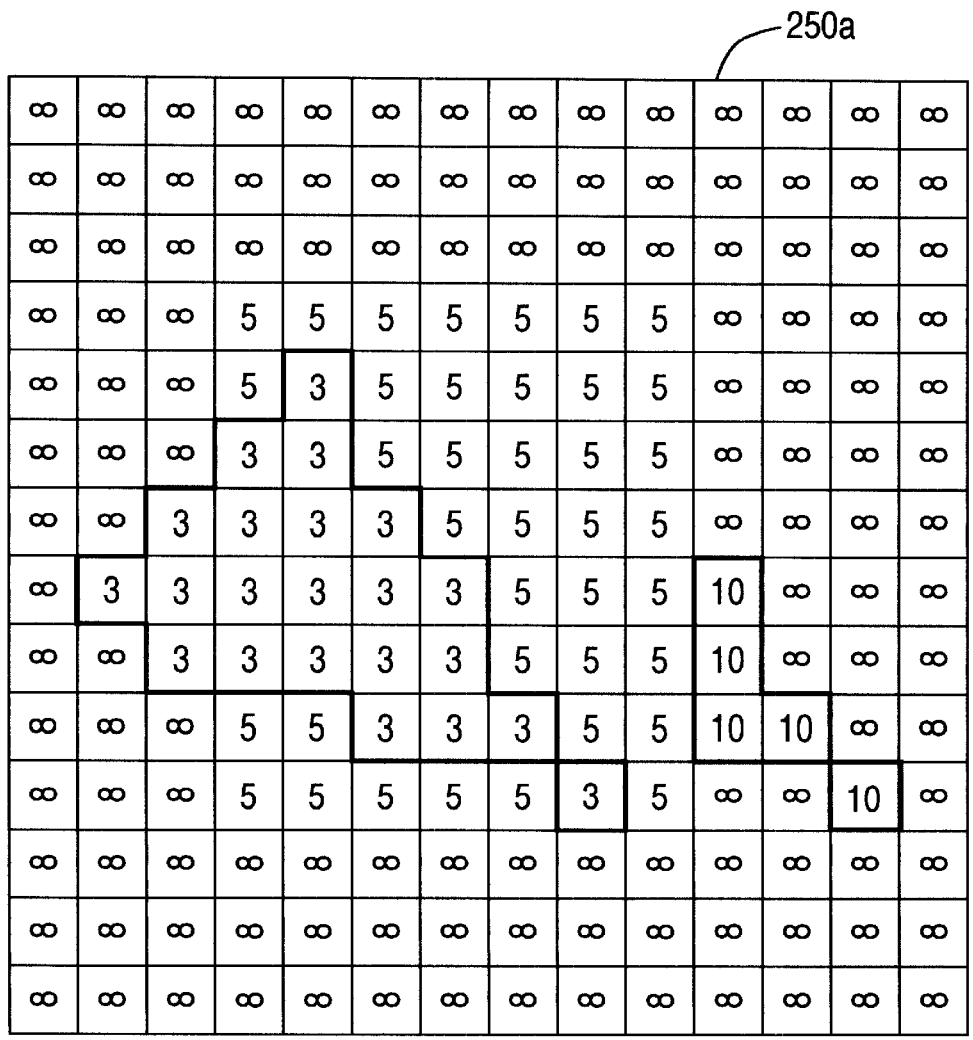
FIG. 2B illustrates a Z-map corresponding to a higher depth level of a Z-stack according to one embodiment of the present invention.
Figure 2C:
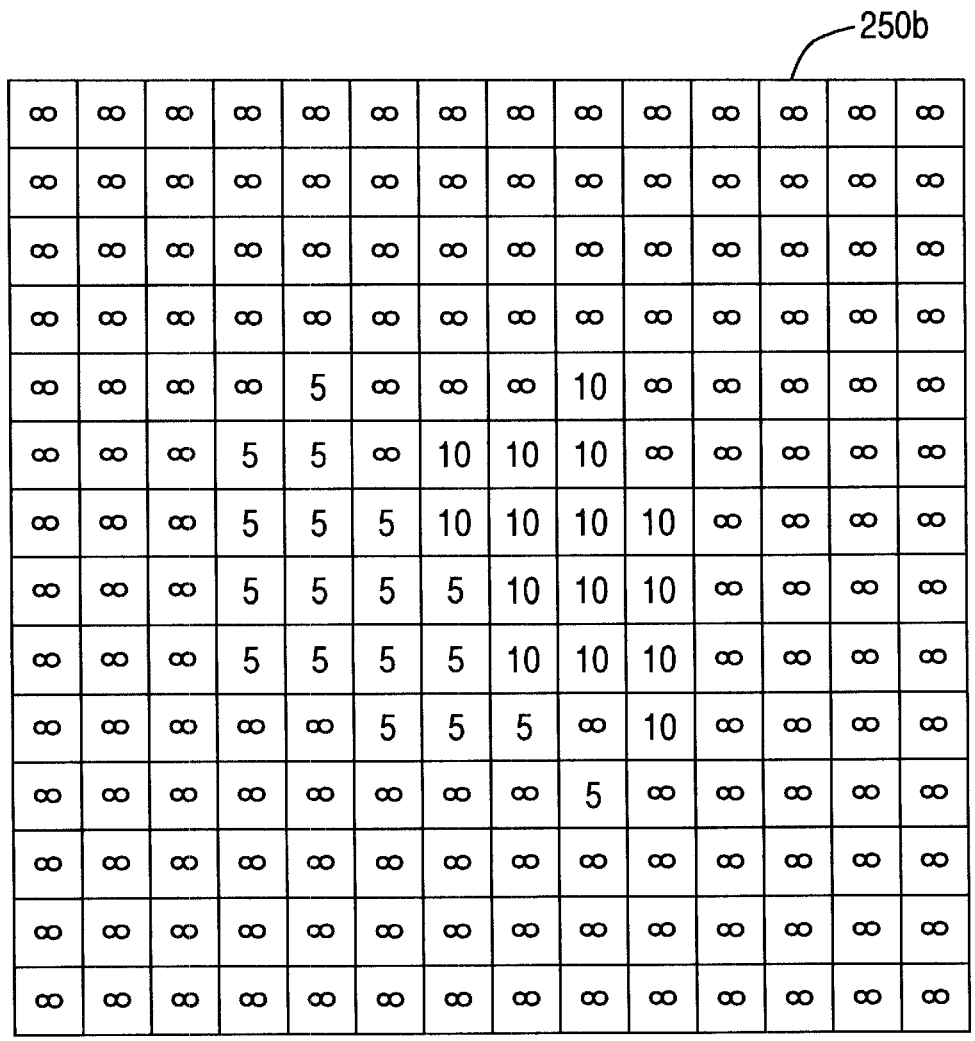
FIG. 2C illustrates a Z-map corresponding to a lower depth level of a Z-stack according to one embodiment of the present invention.

According to one embodiment of the present invention, occlusion culling of transparent polygons is attained by the use of a Z-stack, or a stack of Z-maps to store depth information of the transparent objects. A Z-stack may be implemented in software and may reside within RAM 102 of computer system 110. An exemplary Z-stack, which contains depth information of exemplary scene 200 of FIG. 2A, is illustrated in FIGS. 2B–2C. In the specific embodiment as illustrated, the Z-stack comprises two Z-maps 250a–250b corresponding to a minimum number of polygon layers required for achieving an occlusion effect. First Z-map 250a contains Z-values corresponding to a frontmost surface of the objects in the scene. As shown in FIG. 2A, the first triangle 210 in scene 200 has a Z-value of 3. Accordingly, portions of Z-map 250a corresponding to the first triangle 210 contain the Z-value 3. Further, portions of Z-map 250a corresponding to section 222 of rectangle 220 contain the Z-value 5. Z-values of section 221 of the rectangle 220, however, are not stored in the first Z-map 250a. Rather, Z-values of section 221 are stored in second Z-map 250b. Further, portions of Z-map 250a corresponding to section 231 of second triangle 230 contain Z-value of 10. Z-values corresponding to sections 232 and 233 of triangle 230, however, are not stored in Z-map 250a. Objects that are far away have a larger Z-value than objects that are close. Further, when the Z-maps 250a–250b are first initialized, all the entries contain a depth value of ∞, or a large arbitrary number.

In the specific embodiment as illustrated, Z-values corresponding to deeper levels of the transparent objects are stored in a lower-ranked Z-map 250b. Particularly, Z-values corresponding to section 221 of rectangle 220 are stored in Z-map 250b. Portions of Z-map 250b corresponding to section 221 of rectangle 220 contain the Z-value of 5. Further, portions of Z-map 250b corresponding to section 232 of triangle 230 contain the Z-value of 2. Z-values corresponding to section 233 of triangle 230 may be stored in additional Z-maps (not shown) of the Z-stack. Alternatively, Z-values of section 233 are simply not stored because it is pre-defined that objects hidden behind two layers of polygons are occluded.

It should be noted that, in one embodiment of the present invention, the Z-maps may have a lower resolution than that of the frame buffer. A lower resolution would allow the Z-value computations to be performed quickly. In one embodiment, a coarser resolution is achieved by representing the Z-values of a group of pixels by a highest Z-value associated with the group, representing a more conservative culling approach. Alternatively, in a more aggressive culling approach, an average Z-value associated with a group of pixels may be used. It should also be noted that, as illustrated in FIGS. 2B and 2C, Z-maps 250a and 250b of the Z-stack have the same resolution and include a same number of entries for storing Z-values.

Figure 3:
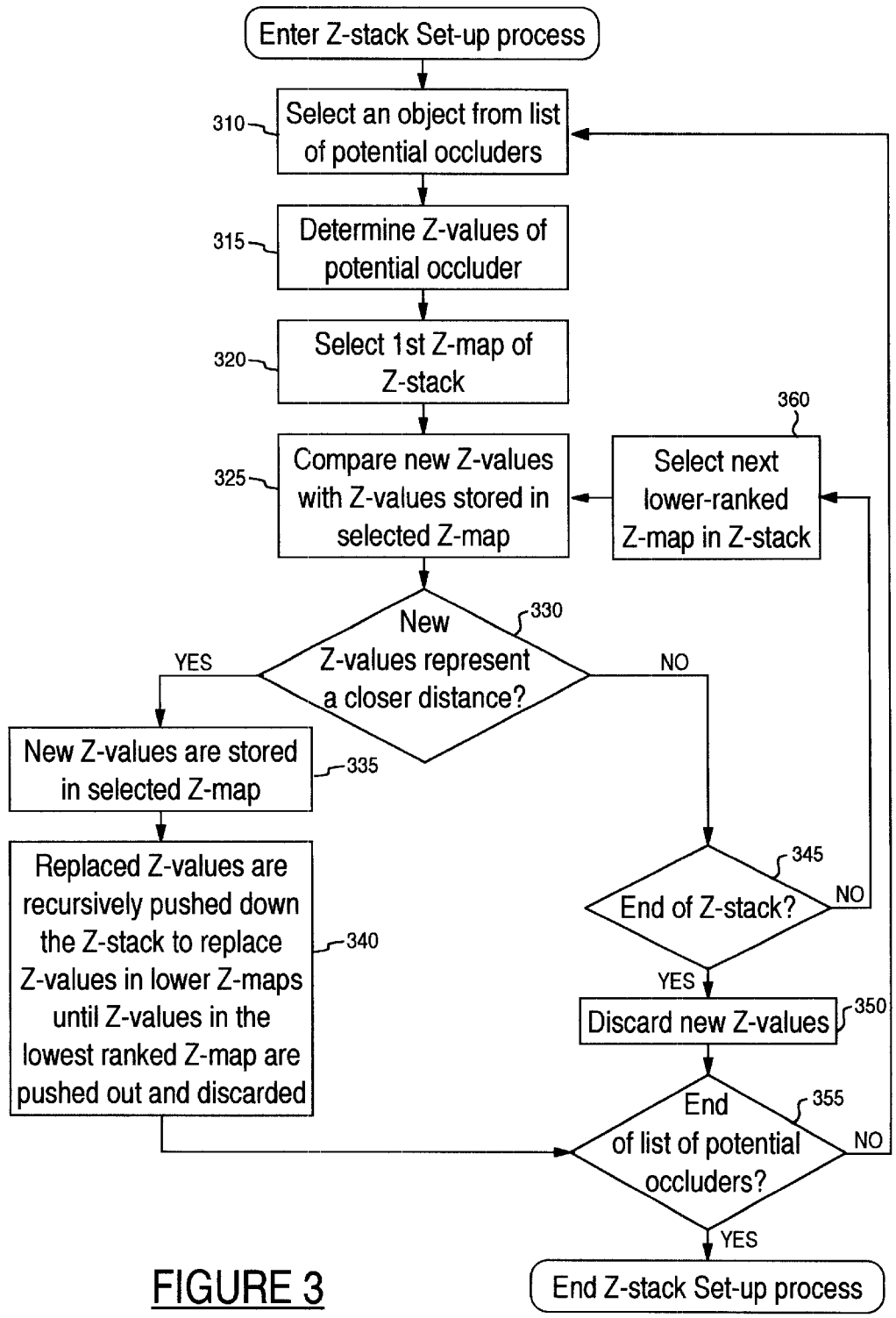
FIG. 3 is a flow diagram illustrating the process of setting up a Z-stack according to one embodiment of the present invention.

FIG. 3 is a flow diagram illustrating the process of setting up a Z-stack according to one embodiment of the present invention. In step 310, a number of potential occluders are selected from all the polygons in the scene. According to the present embodiment, the potential occluders are selected based on historical information. For instance, a polygon which was visible in the previous frame is selected as a potential occluder in the present frame because there is a high probability that the polygon will be visible and occluding others in the present frame. It should be apparent to those ordinarily skilled in the art, upon reading the present disclosure, that a list of potential occluders may also be selected from a previous frame under various different criteria.

In one embodiment of the present invention, the number of polygons or objects chosen as potential occluders is user-selectable. Generally, an optimal number of potential occluders is dependent on the hardware used, and the nature of the graphics data that are being presented. For instance, a large number of potential occluders may be selected if the graphics hardware has a large processing bandwidth, or if a scene being rendered includes a large number of fine objects or polygons. In the present embodiment, the number of polygons or objects chosen as potential occluders is 10% to 15% of the total number of polygons in the scene. For very large scenes, the number of polygons or objects chosen as potential occluders may fall to under 1% of the total number of polygons in the scene.

In step 315, Z-values, or depth values, for the selected potential occluders are determined. According to the present embodiment, Z-values for the potential occluders may be determined by graphics hardware or by CPU computation. The method of determining the Z-values by CPU computation in detail in Section IV below, and the method of determining Z-values by graphics hardware is discussed is discussed in Section V below.

In step 320, a highest-ranked Z-map of the Z-stack is selected. In one embodiment, the highest-ranked Z-map is for storing Z-values representing frontmost surfaces of frontmost objects visible in the scene. With respect to the Z-stack as illustrated in FIGS. 2B–2C, the highest-ranked Z-map corresponds to the first Z-map 250a.

In step 325, newly determined Z-values for the selected potential occluder are compared against the Z-values contained in the selected Z-map. In the present embodiment, the Z-values are compared pixel-by-pixel. For example, new Z-value associated with a pixel is compared with the stored Z-value associated with the same pixel.

In step 330, it is determined whether the newly determined Z-values for the selected potential occluder represent a closer distance than that represented by the Z-values in the selected Z-map. Further, in the specific embodiment as illustrated in FIGS. 2B–2C, a closer distance is represented by a lower Z-value. A Z-value of 3 is closer than a Z-value of 5. However, it should be understood that, in other embodiments of the present invention, closer distances may also be represented by a higher Z-value.

In step 335, if the newly determined Z-values for the selected potential occluder represent a closer distance, then the new Z-values are written in the selected Z-map.

In step 340, the old Z-values of the selected Z-map are recursively pushed down the Z-stack to replace Z-values in lower-ranked Z-maps. For example, in the specific embodiments as illustrated in FIGS. 2B–2C, if Z-values are written in first Z-map 250a, the replaced Z-values originally stored in first Z-map 250a will be pushed down and stored in second Z-map 250b. The process is repeated until Z-values stored in the lowest-ranked Z-map are pushed out of the Z-stack and discarded.

In step 355, after the new Z-values are stored in the Z-stack, it is determined whether all the potential occluders have been processed. If all potential occluders have been processed, the process returns. Otherwise, steps 310 through 355 are repeated for another potential occluder.

If it is determined that, in step 340, the newly determined Z-values do not represent a closer distance than the Z-values stored in the selected Z-map, then, in step 350, it is determined whether the end of the Z-stack has been reached. If the end of the Z-stack has not been reached yet, in step 360, a next lower-ranked Z-map in the Z-stack is selected, and steps 325 through 360 are then repeated.

If it is determined that the end of the Z-stack has already been reached, then the object associated with the new Z-values are considered to be irrelevant. Thus, in step 350, the new Z-values are discarded, and in step 355, it is determined whether all the potential occluders have been processed. If so, the process returns. Otherwise, steps 310 through 355 are repeated for another potential occluder.

IV. Z-VALUE COMPUTATION USING BOUNDED-VOLUME APPROXIMATION

Figure 4A:
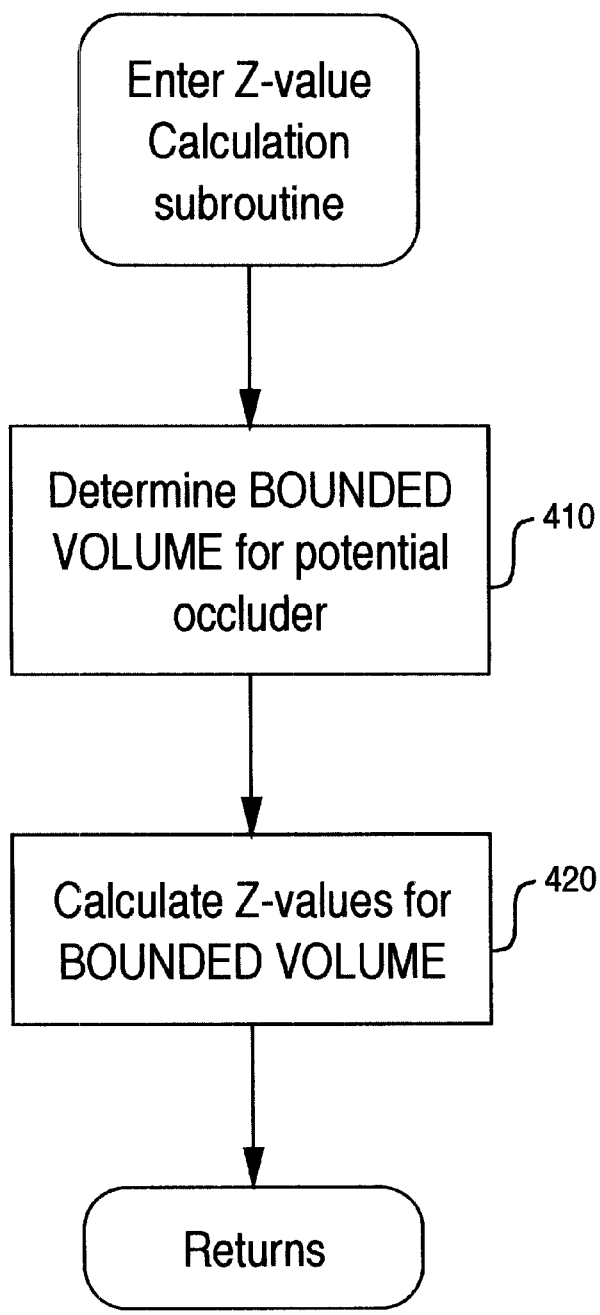
FIG. 4A is a flow diagram illustrating the process of determining the Z-values of potential occluders according to one embodiment of the present invention.

According to one embodiment of the present invention, potential occluders may have a variety of sizes and shapes. For some objects having a complex geometrical shape, it may be too CPU-intensive to calculate their precise Z-values in real time for interactive applications. Moreover, architecture of currently available CPUs are typically not adapted for high-speed graphics processing. Thus, it is advantageous to use a bounded-volume approximation method to determine the Z-values of the potential occludees. FIG. 4A is a flow diagram illustrating the process of determining the Z-values of potential occluders according to the present embodiment.

In the present embodiment, a hierarchical graphics model is adopted. Essentially, in a hierarchical graphics model, relationships of objects in a model are represented with a tree structure. Usually, a tree structure is made up of a root node, and a number of other nodes which are children or grand-children of the root node. Each node may have one or more dependent or "child" node. Significantly, each node has a bounded volume (or bounded box) which is a largest simple 3-D primitive (e.g. a cube) that can be fitted within the geometric extent of that node. It is important to note the distinction between a bounded volume and a bounding volume. A bounding volume, in contrast to a bounded volume, is the smallest simple 3-D primitive which encompasses the entire geometric extent of that node. For example, a model of a hand may be represented by a root node (hand), and five nodes, each representing a finger, which are children of the root node. Each finger node may in turn beget children nodes such as nails, finger print, etc. In addition, the root node will have a bounded volume which can be fitted within the geometric extent of the entire hand. The root node will also have a bounding volume which encompasses the entire geometric extent of the hand. For increased flexibility, the bounded volume may be a collection of boxes or other low polygon-count geometries.

Referring to FIG. 4A, in step 410, a bounded volume of a potential occluder is determined. As discussed above, a bounded volume is the largest 3-D primitive that can be fitted within the extent of the potential occluder. In one embodiment of the present invention, for ease of computation, the geometrical shape may be a cube or a rectangular box. Methods for determining a bounded volume for 3-D objects are well known in the art. Therefore, such methods are not discussed here in detail so as to avoid obscuring aspects of the present invention.

In step 420, Z-values of the surfaces of the bounded volume are calculated. The methods of calculating Z-values of a surface of 3-D objects are well known in the art. Therefore, details of such implementations are also not discussed here so as to avoid obscuring aspects of the present invention. After the Z-values are calculated, the Z-values will then be used in other steps of the occlusion culling process.

V. Z-VALUE COMPUTATION USING DEDICATED GRAPHICS HARDWARE

Figure 4B:
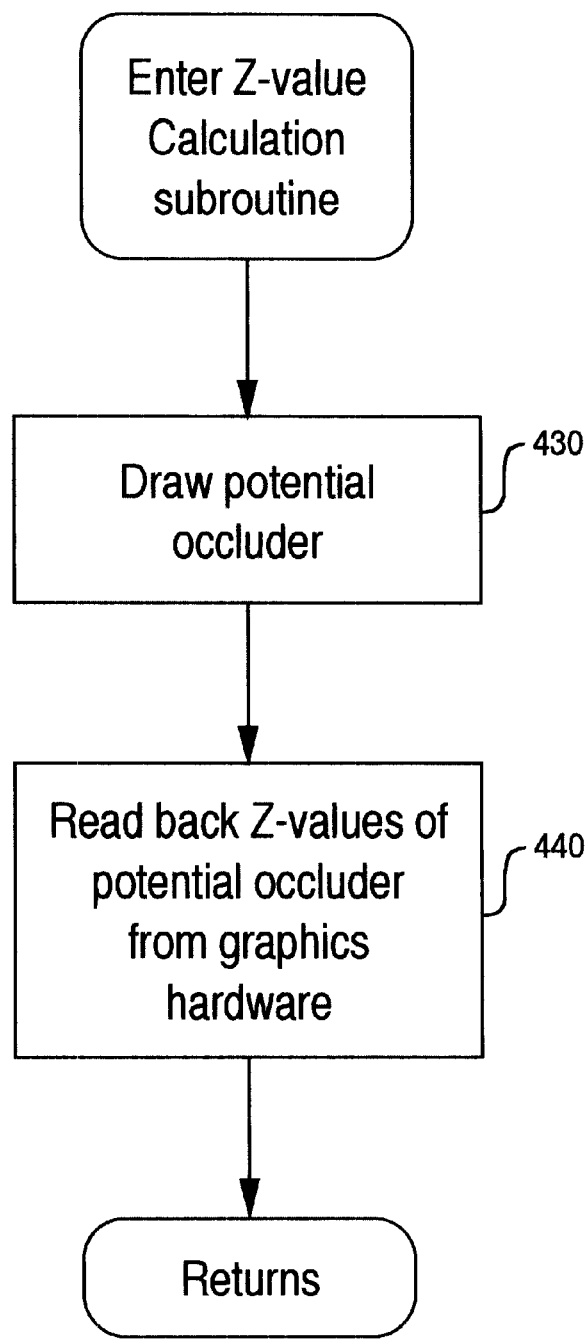
FIG. 4B is a flow diagram illustrating the process of determining Z-values for potential occluders according to another embodiment of the present invention.

According to another embodiment of the present invention, Z-values of potential occluders may be calculated by dedicated graphics hardware. In one embodiment of the present invention, dedicated graphics hardware includes a hardware Z-buffer for storing Z-values of polygons that are drawn. FIG. 4B illustrates the process of determining Z-values for potential occluders according to the present embodiment. As illustrated in FIG. 4B, in step 430, a potential occluder is sent down the graphics pipeline to be rendered. The potential occluder is treated as an opaque object when drawn such that Z-values of the potential occluder is stored in the hardware Z-buffer.

In step 440, the Z-values of the potential occluder is read back from the dedicated graphics hardware to be stored in a Z-stack according to the process described above in Section 11. After a potential occluder is drawn, the hardware Z-buffer is flushed.

In another embodiment of the present invention, the Z-stack may be implemented in hardware. Unlike conventional graphics hardware which includes a single Z-buffer for storing depth information of a scene, special graphics hardware according to the present invention includes a stack of Z-buffers for storing Z-values representing different depth levels of the transparent objects. In this embodiment, each of the Z-buffers of the Z-buffer stack is configured for storing Z-values at a particular depth level. For instance, Z-values representing distances of the frontmost surfaces of the frontmost objects are stored in a first one of the Z-buffers. Similarly, Z-values of polygons in the second layer are stored in a second one of the Z-buffers. In this embodiment, potential occluders may be drawn before Z-values are read back from the graphics hardware. Further, according to the present embodiment, the Z-values stored in the Z-buffers may be read back into system memory to be stored in a Z-stack after all the potential occluders have been drawn.

It is important to note that ordered rendering is required for good transparent rendering. This could be achieved by a corresponding frame buffer stack with a final compositing stage after all polygons have been received.

VI. TESTING OBJECTS AND POLYGONS AGAINST Z-STACK

Figure 5:
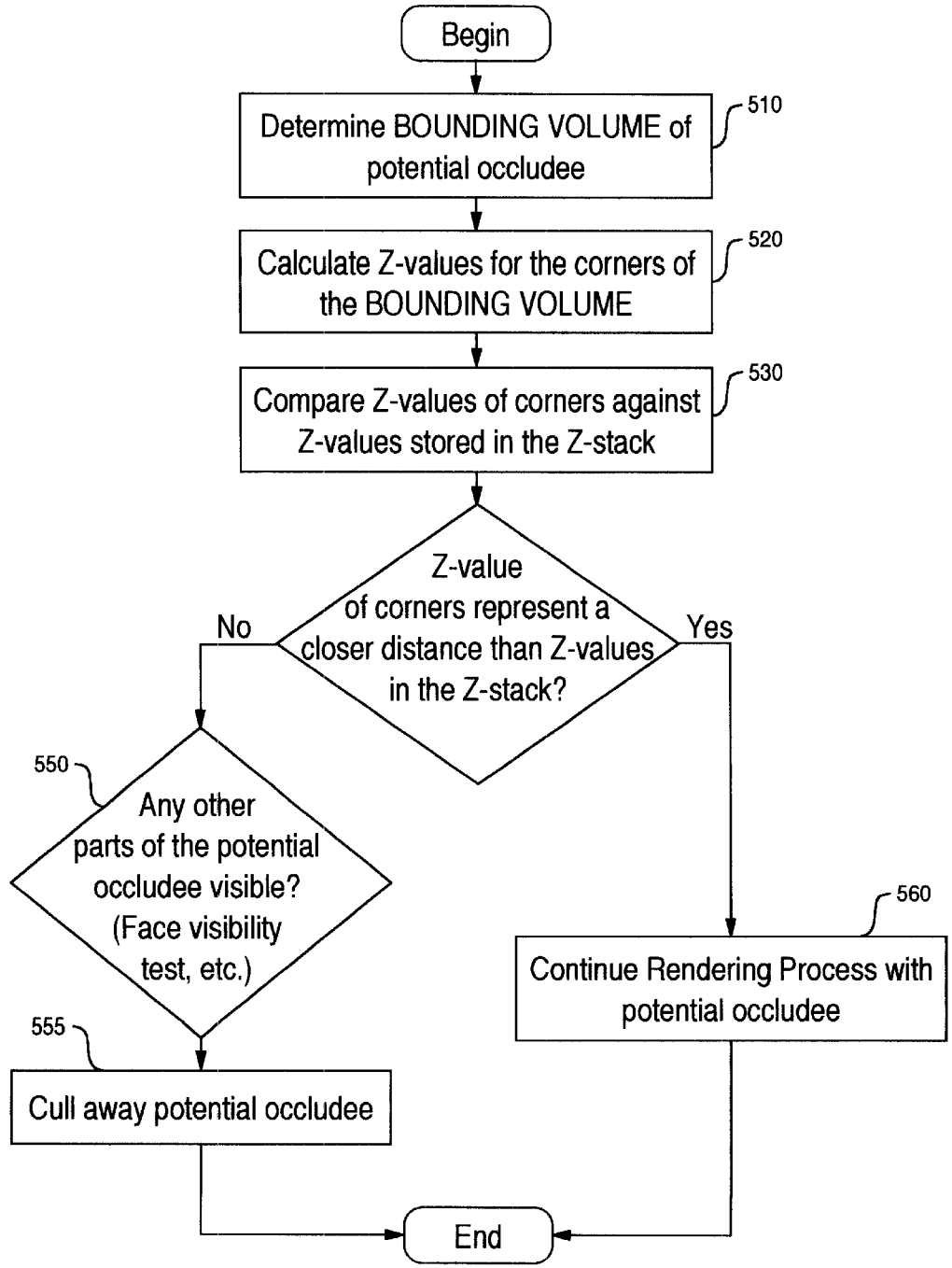
FIG. 5 is a flow diagram illustrating the process of culling potential occludees according to the present embodiment.

In one embodiment of the present invention, each object or polygon in the scene is tested against the Z-stack to determine whether the object or the polygon is occluded by the potential occluders. Objects that are not selected as potential occluders are referred to as potential occludees. FIG. 5 is a flow diagram illustrating the process of culling potential occludees according to the present embodiment. As illustrated in FIG. 5, in step 510, a bounding volume of the potential occludee is determined. In accordance with one embodiment of the present invention, a bounding volume may be the smallest rectangular box that may be fitted around the potential occludee. As discussed above in Section IV, methods of determining the bounding volume for a 3-D object is well known in the art, and are therefore not discussed here in order to avoid obscuring aspects of the present invention.

In step 520, Z-values for the corners of the bounding volume are determined. The Z-values for the corners of the bounding volume may be determined by conventional methods.

In step 530, Z-values for the corners of the bounding volume are compared against the Z-values stored in the Z-stack. If the Z-values for the corners of the bounding volume represent a closer distance than those represented by the Z-values stored in the Z-stack, then the potential occludee is likely to be visible. Thus, in step 560, further rendering processes are performed for the potential occludee, and the potential occludee is drawn.

However, if the Z-values for the corners of the bounding volume represent a farther distance than those represented by the Z-values stored in the Z-stack, then the potential occludee is more likely to be substantially occluded. Hence, in step 550, a more detailed visibility test (e.g. a 3-face visibility test) is performed to determine the visibility of the polygons. More detailed visibility tests, such as the 3-face visibility test, are well known in the art. Therefore, it should be apparent to those ordinarily skilled in the art, upon reading the present disclosure, that other well known visibility tests may also be applied.

In step 555, if it is determined that the potential occludee is occluded, the potential occludee is culled away or removed from the graphics pipeline. In this way processing power is not wasted on objects that are substantially occluded.

In furtherance of one embodiment of the present invention, each polygon or object within the scene is associated with a "tag" for identifying the polygon or object. Further, in this embodiment, a list containing tags associated with potential occluders represented in the Z-stack is maintained. When it is determined that a new polygon or object is visible, the list is updated to include the tag associated with the new polygon or object. In this way, after a frame is completely rendered, a list containing tags associated with all the visible polygons is resulted. The list may then be consulted when a next frame is rendered. In applications where polygons and object do not change randomly from one frame to another, this approach will significantly increase rendering efficiency as visible polygons or objects in one frame are likely to be potential occluders in the next frame.

The method of and apparatus for efficiently rendering a complex transparent scene has thus been described. By using the method of the present invention, objects hidden underneath layers of semi-transparent polygons may be culled, thus effectively minimizing the processing power wasted on the hidden polygons. Thus, complex transparent scenes may be rendered on machines with limited processing power. Another significant benefit of the present invention is that the Z-stack stores depth information of the most visible polygons in the scene, allowing optimal back-to-front rendering. Yet another benefit of the present invention is that the Z-stack allows culling to be performed on multiple processors simultaneously and followed by optimal fast rendering.

What is claimed is:

1. In a computer system, a method of efficiently rendering a complex scene, said complex scene including a plurality of non-opaque objects, the method comprising the steps of:
   a) designating a first set of said plurality of non-opaque objects as potential occluders and designating a second set of said plurality of non-opaque objects as potential occludees;
   b) providing a number that represents the minimum number of layers of overlapping translucent polygons determined to produce an occlusion effect;
   c) storing a plurality of Z-maps that include Z-values, each of said Z-maps corresponding to a depth-level of said potential occluders, the number of Z maps equal to the minimum number of layers of overlapping translucent polygons determined to produce an occlusion effect provided in step b);
   d) determining whether a respective one of said potential occludees is hidden behind said potential occluders by comparing Z-values of said respective potential occludee against said Z-values within said Z-maps; and
   e) culling said potential occludee when said potential occludee is hidden behind said potential occluders.

2. The method according to claim 1 wherein said step (d) further comprises the steps of:
   determining a bounding volume for said respective potential occludee;
   determining a plurality of Z-values corresponding to said bounding volume; and
   comparing said plurality of Z-values corresponding to said bounding volume with said plurality of Z-values within said Z-maps.

3. The method according to claim 1 wherein said first set of said plurality of non-opaque objects are selected according to visibility information determined in a previous frame.

4. In a computer system, a method of efficiently rendering a complex transparent scene, said complex transparent scene including a plurality of transparent objects, the method comprising the steps of:
   a) designating a first set of said plurality of transparent objects as potential occluders and designating a second set of said plurality of transparent objects as potential occludees;
   b) providing a number that represents the minimum number of layers of overlapping translucent polygons determined to produce an occlusion effect;
   c) storing a plurality of Z-maps that include Z-values, each of said Z-maps corresponding to a depth-level of said potential occluders, wherein a single pixel corresponds to one of said Z-values within each of said Z-maps, the number of Z maps equal to the minimum number of layers of overlapping translucent polygons determined to produce an occlusion effect provided in step b);
   d) determining whether a respective one of said potential occludees is hidden behind said potential occluders by comparing Z-values of said respective potential occludee against said Z-values within said Z-maps; and
   e) culling said potential occludee when said potential occludee is hidden behind said potential occluders such that rendering efficiency of said complex transparent scene is increased, said potential occludee determined to be hidden when the Z-values of said potential occludee do not represent a closer distance than the corresponding Z-values within said plurality of Z-maps.

5. The method according to claim 4 wherein said step (d) further comprises the steps of:
   determining a bounding volume for said respective potential occludee;
   determining a visibility of a plurality of corners of said bounding volume; and
   provided said plurality of corners are determined to be occluded, performing a face visibility test for said respective potential occludee.

6. The method according to claim 4 wherein said first set of said plurality of transparent objects are selected based on visibility information determined in a previous frame.

7. The method according to claim 6 further comprising the steps of:
   maintaining a list of visible objects in a current frame; and
   designating potential occluders in a next frame according to said list of visible objects.

8. A computer system comprising a processor coupled to a bus and a memory coupled to said bus wherein said memory contains instructions for implementing a method of efficiently rendering a complex transparent scene, said complex transparent scene including a plurality of transparent objects, the method comprising the steps of:

a) designating a first set of said plurality of transparent objects as potential occluders and designating a second set of said plurality of transparent objects as potential occludees;

b) providing a number that represents the minimum number of layers of overlapping translucent polygons determined to produce an occlusion effect; and c) storing a plurality of Z-maps that include Z-values, each of said Z-maps corresponding to a depth-level of said potential occluders, the number of Z-maps equal to the minimum number of layers of overlapping translucent polygons determined to produce an occlusion effect provided in step b);

d) determining whether a respective one of said potential occludees is hidden behind said potential occluders by comparing Z-values of said respective potential occludee against said Z-values within said Z-maps; and e) culling said potential occludee when said potential occludee is hidden behind said potential occluders such that rendering efficiency of said complex transparent scene is increased.

9. The computer system as described in claim 8 wherein said step (d) further comprises the steps of:

determining a bounding volume for said respective potential occludee;

determining a visibility of a plurality of corners of said bounding volume; and provided that said plurality of corners are determined to be invisible, performing a face visibility test on said [selected transparent respective potential occludee.

10. The computer system as described in claim 9 wherein said step (d) further comprises the step of:

removing said respective potential occludee from further processing provided that said respective potential occludee fails said face visibility test.

11. The computer system as described in claim 9 wherein said method further comprises the step of:

maintaining a list of visible objects in a current frame; and designating potential occluders in a next frame according to said list of visible objects.

12. A computer-usable medium having computer-readable program code embodied therein for causing a computer to perform a method of efficiently rendering a complex transparent scene, said complex transparent scene including a plurality of transparent objects, said method comprising the steps of:

a) designating a first set of said plurality of transparent objects as potential occluders and designating a second set of said plurality of transparent objects as potential occludees;

b) providing a number that represents the minimum number of layers of overlapping translucent polygons determined to produce an occlusion effect; and c) storing a plurality of Z-maps that include Z-values, each of said Z-maps corresponding to a depth-level of said potential occluders, the number of Z maps equal to the minimum number of layers of overlapping translucent polygons determined to produce an occlusion effect provided in step b);

d) determining whether a respective one of said potential occludees is hidden behind said potential occluders by comparing Z-values of said respective potential occludee against said Z-values within said Z-maps; and e) culling said potential occludee when said potential occludee is hidden behind said potential occluders such that rendering efficiency of said complex transparent scene is increased.

13. The computer-usable medium as recited in claim 12 wherein said step (d) further comprises the steps of:

determining a bounding volume for said respective potential occludee;

determining a visibility of a plurality of corners of said bounding volume; and provided that said plurality of corners are determined to be invisible, performing a face visibility test on said respective potential occludee.

14. The computer system as described in claim 13 wherein said step (d) further comprises the step of:

removing said respective potential occludee from further processing provided that said respective potential occludee fails said face visibility test.

15. The computer system as described in claim 12 wherein said method further comprises the step of:

maintaining a list of visible objects in a current frame; and designating potential occluders in a next frame according to said list of visible objects.

* * * * *

UNITED STATES PATENT AND TRADEMARK OFFICE
CERTIFICATE OF CORRECTION

PATENT NO. : 6,456,285 B2
DATED : September 24, 2002
INVENTOR(S) : Simon Hayhurst It is certified that error appears in the above-identified patent and that said Letters Patent is hereby corrected as shown below:

Column 4,
Line 58, please delete "1 10" and insert therefore -- 110 --.

Signed and Sealed this

Twenty-ninth Day of April, 2003

JAMES E. ROGAN
*Director of the United States Patent and Trademark Office*